US012738652B2

(12) United States Patent
Tsai et al.

(10) Patent No.: US 12,738,652 B2
(45) Date of Patent: Sep. 15, 2026

(54) ANTENNA STRUCTURE

(71) Applicant: Wistron NeWeb Corporation, Hsinchu (TW)

(72) Inventors: Yi-Che Tsai, Hsinchu (TW); Ci-Jin Huang, Hsinchu (TW); Chin-Yang Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 75 days.

(21) Appl. No.: 18/919,494

(22) Filed: Oct. 18, 2024

(65) Prior Publication Data

US 2025/0141106 A1 May 1, 2025

(30) Foreign Application Priority Data

Nov. 1, 2023 (TW) ................................ 112142127

(51) Int. Cl.

*H01Q 5/50* (2015.01)
*H01Q 1/48* (2006.01)
*H01Q 5/15* (2015.01)
*H01Q 5/328* (2015.01)

(52) U.S. Cl.

CPC ................ *H01Q 5/50* (2015.01); *H01Q 1/48* (2013.01); *H01Q 5/15* (2015.01); *H01Q 5/328* (2015.01)

(58) Field of Classification Search

CPC ........... H01Q 1/246; H01Q 1/38; H01Q 1/48; H01Q 1/52; H01Q 5/30-50; H01Q 21/065; H01Q 21/26-30

See application file for complete search history.

(56) References Cited

U.S. PATENT DOCUMENTS 11,735,829 B2 * 8/2023 Harel .................... H01Q 21/26 343/853
11,894,892 B2 * 2/2024 Junttila ................. H01Q 1/246
2016/0248170 A1 * 8/2016 Bisiules .................. H01Q 5/42
2019/0273315 A1 * 9/2019 Hu .................... H01Q 21/0006
2024/0258684 A1 * 8/2024 Wu ...................... H01Q 19/108

FOREIGN PATENT DOCUMENTS

CN 103339855 A 10/2013

* cited by examiner

*Primary Examiner* — Hasan Islam
(74) *Attorney, Agent, or Firm* — McClure, Qualey & Rodack, LLP

(57) ABSTRACT

An antenna structure includes a first frequency band antenna and a second frequency band antenna. The first frequency band antenna is operated at a first frequency band. The second frequency band antenna is operated at a second frequency band, and includes a feeding portion, a balun and at least one antenna unit. The balun is connected to the feeding portion. The at least one antenna unit is connected to the balun. The first frequency band is different from the second frequency band.

17 Claims, 11 Drawing Sheets

ANTENNA STRUCTURE

RELATED APPLICATIONS

This application claims priority to Taiwan Application Serial Number 112142127, filed Nov. 1, 2023, which is herein incorporated by reference.

BACKGROUND

Technical Field

The present disclosure relates to an antenna structure. More particularly, the present disclosure relates to a multi-band antenna structure.

Description of Related Art

An electronic device with dual-bands requires high Adjacent Channel Rejection (ACR) when operated at two frequency bands at the same time. Further, an interference between two frequency bands increases under conditions of a high power, outdoor use or with external antennas. Thus, an isolation requirement of an electronic device with external high-gain antenna also increases.

The conventional electronic device enlarges a gap between adjacent antennas, expands the electrical length of the electromagnetic wave while radiating in the air, so as to decrease the interference received by the adjacent antenna. However, the size of the antenna increases as the isolation of the antenna increases. Moreover, another way to decrease the interference of the adjacent antenna is to dispose an isolator between antennas with dual frequency bands. However, the parameter of the antenna must be adjusted.

Therefore, an antenna structure which can increase the antenna isolation is commercially desirable.

SUMMARY

According to one aspect of the present disclosure, an antenna structure includes a first frequency band antenna and a second frequency band antenna. The first frequency band antenna is operated at a first frequency band. The second frequency band antenna is operated at a second frequency band, and includes a feeding portion, a balun and at least one antenna unit. The balun is connected to the feeding portion. The at least one antenna unit is connected to the balun. The first frequency band is different from the second frequency band.

According to another aspect of the present disclosure, an antenna structure includes a first antenna array and a second antenna array. The first antenna array is operated at a first frequency band. The second antenna array is operated at a second frequency band, and includes a feeding portion, a power divider, a plurality of antenna units and a balun. The power divider is connected to the feeding portion. The antenna units are connected to the power divider. The balun is connected between the power divider and one of the antenna units. The first frequency band is different from the second frequency band.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
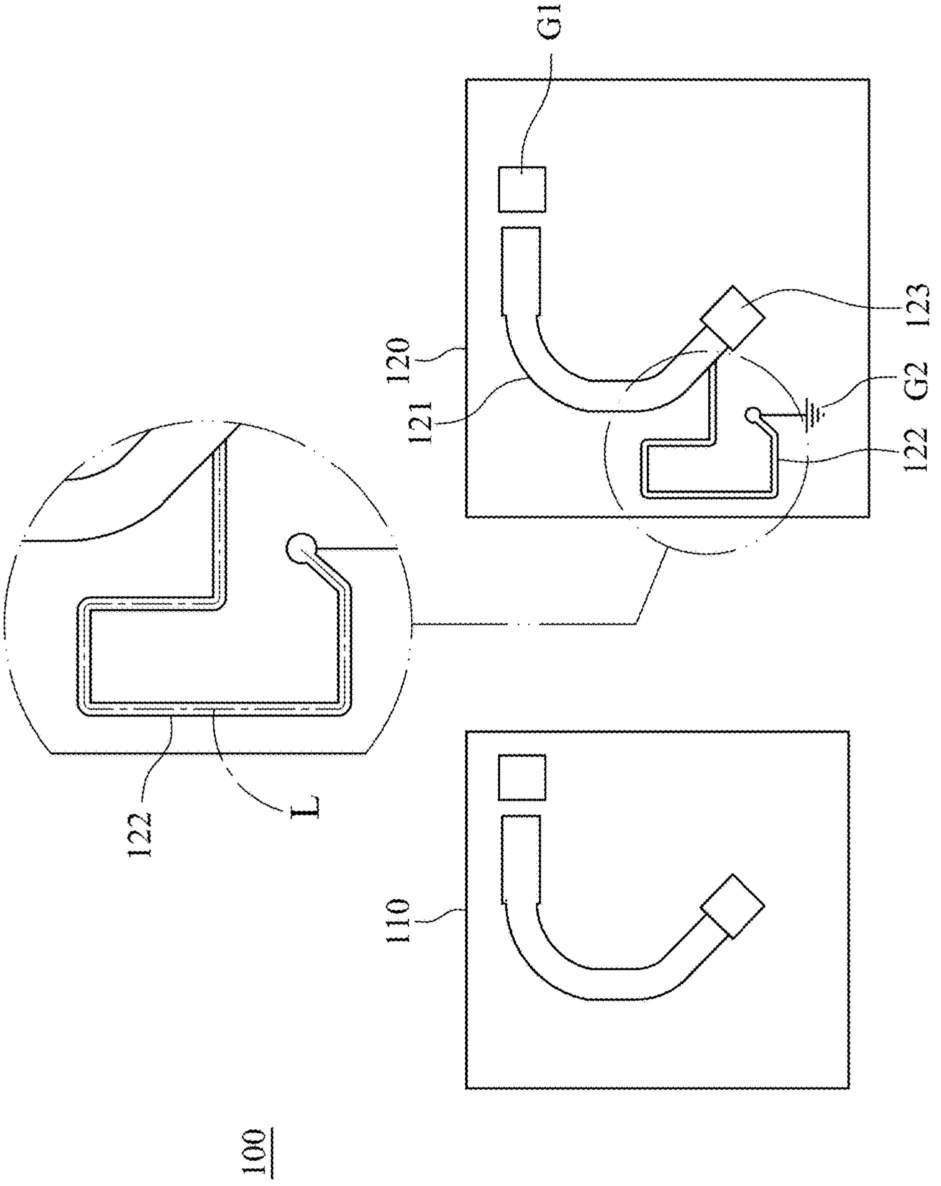
FIG. 1 shows a schematic view of an antenna structure according to a first embodiment of the present disclosure.

Please refer to FIG. 1. FIG. 1 shows a schematic view of an antenna structure 100 according to a first embodiment of the present disclosure. An antenna structure 100 includes a first frequency band antenna 110 and a second frequency band antenna 120. The first frequency band antenna 110 is operated at a first frequency band. The second frequency band antenna 120 is operated at a second frequency band, and includes a feeding portion 121, a balun 122 and at least one antenna unit 123. The feeding portion 121 is connected between a grounding portion G1 and the antenna unit 123, and the feeding portion 121 can be a feeding signal line. The balun 122 is connected between the feeding portion 121 and the grounding portion G2. The antenna unit 123 is connected to the balun 122. The first frequency band is different from the second frequency band.

Thus, the antenna structure 100 of the present disclosure can increase the isolation between the first frequency band antenna 110 and the second frequency band antenna 120 via the balun 122.

In detail, a length of the balun 122 is L, a wavelength of the second frequency band antenna 120 operated at the second frequency band is λ, and the following condition is satisfied by a formula (1):

$$L = \frac{(2N-1)\lambda}{4}. \tag{1}$$

In detail, N is a positive integer, a shape of the balun 122 can be adjusted according to the space limitation of the second frequency band antenna 120. Nevertheless, the whole length L of the balun 122 must be satisfied by the aforementioned formula (1), and the length L can be shown as a central line of the balun 122 labeled in FIG. 1. In the first embodiment, the antenna unit 123 can be a dipole antenna, but the present disclosure is not limited thereto.

For example, if the antenna structure 100 has a Wi-Fi 6E frequency band and a Wi-Fi 7 frequency band (i.e., the first frequency band and the second frequency band), and a coupling is relatively strong when the frequency of the antenna structure 100 is operated between 5725 MHz-5925 MHz, three quarters wavelength of an intermediate value of the aforementioned frequency range (i.e., 5800 MHZ) is substituted into the formula (1) to calculate the length L of the balun 122. Further, when the width of the balun 122 is smaller, it can form a high impedance, the radio frequency signal would not be transmitted to the ground plane easily.

Figure 2:
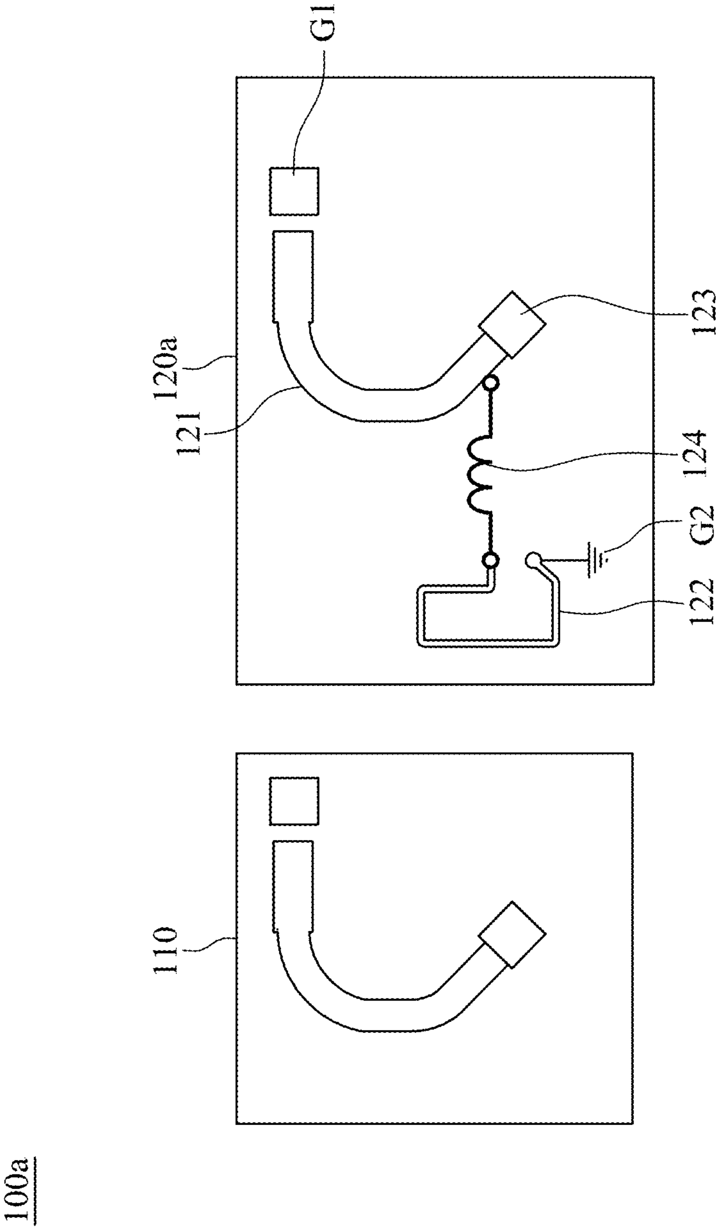
FIG. 2 shows a schematic view of an antenna structure according to a second embodiment of the present disclosure.

Please refer to FIG. 1 and FIG. 2. FIG. 2 shows a schematic view of an antenna structure 100*a* according to a second embodiment of the present disclosure. The antenna structure 100*a* includes a first frequency band antenna 110 and a second frequency band antenna 120*a*. In the second embodiment, the structure of the first frequency band antenna 110 can be the same as the first frequency band antenna 110 or other antenna different from the second frequency band antenna 120*a*, but the present disclosure is not limited thereto. The antenna structure 100*a* can further include a choke element 124. The choke element 124 is connected between the feeding portion 121 of the second frequency band antenna 120*a* and the balun 122. Thus, the antenna structure 100*a* of the present disclosure can prevent the radio frequency signal from flowing into the ground by disposing the choke element 124 at a front terminal of the second frequency band antenna 120*a*.

Figure 3:
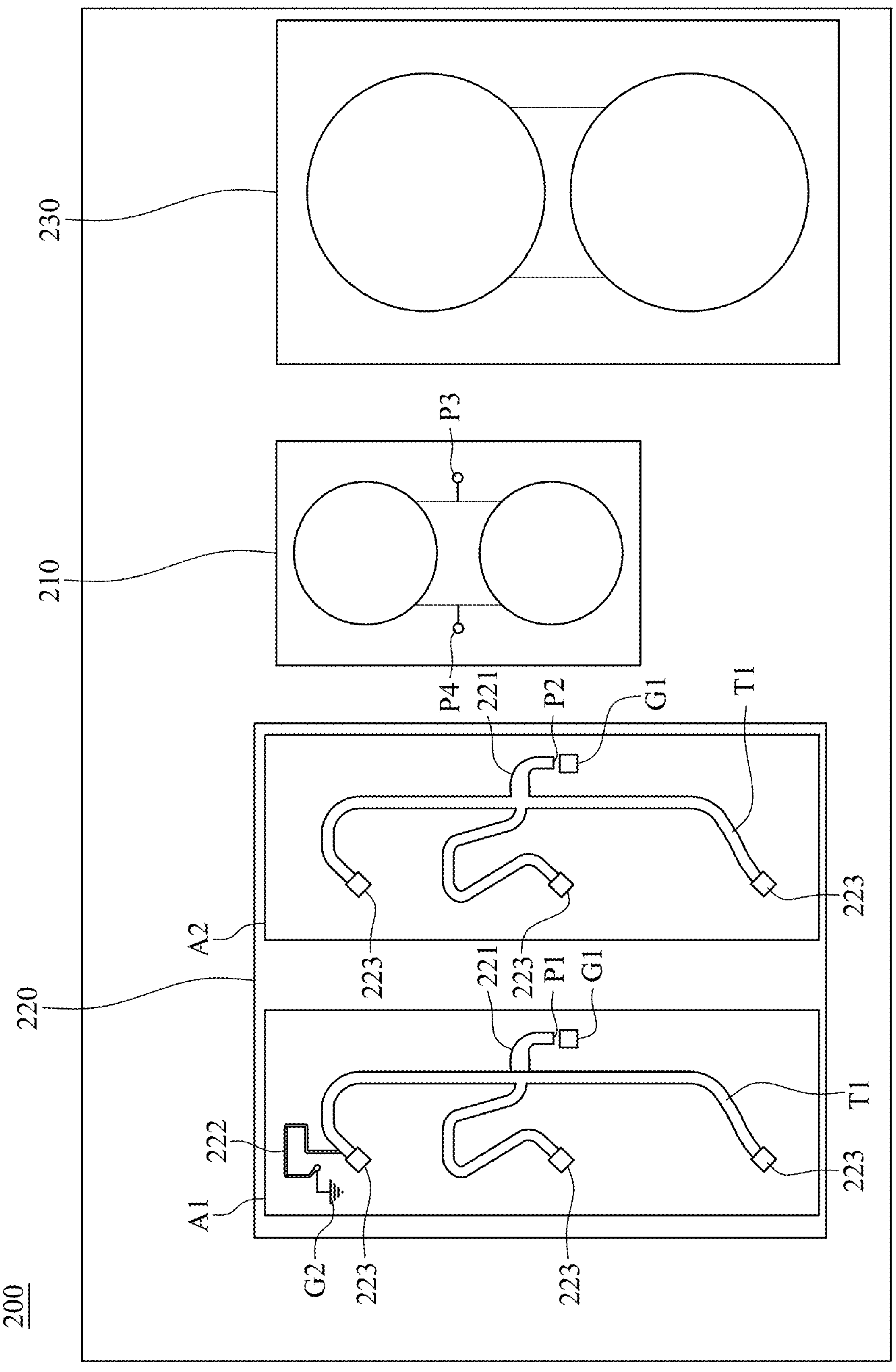
FIG. 3 shows a schematic view of an antenna structure according to a first example of a third embodiment of the present disclosure.

Please refer to FIG. 3. FIG. 3 shows a schematic view of an antenna structure 200 according to a first example of a third embodiment of the present disclosure. The antenna structure 200 includes a first antenna array 210, a second antenna array 220 and a third antenna array 230. The first antenna array 210 is operated at a first frequency band. The second antenna array 220 is operated at a second frequency band, and includes a feeding portion 221, a power divider T1, a plurality of antenna units 223 and a balun 222. The power divider T1 is connected to the feeding portion 221. The antenna units 223 are connected to the power divider T1. The balun 222 is connected between the power divider T1 and one of the antenna units 223. The third antenna array 230 is operated at a third frequency band. The first frequency band, the second frequency band and the third frequency band are different from each other.

The antenna structure 200 includes three antenna arrays, and the three antenna arrays are corresponding to three frequency bands, respectively. The first antenna array 210 is a patch antenna array operated at 5 GHz. The second antenna array 220 is a dipole antenna array operated at 6 GHz. The third antenna array 230 is a patch antenna array operated at 2 GHz. The second antenna array 220 includes a second antenna subarray A1 and a second antenna subarray A2. The first antenna subarray A1 includes a first antenna port P1, a feeding portion 221, a power divider T1, a balun 222 and a plurality of antenna units 223. The second antenna subarray A2 includes a second antenna port P2, a feeding portion 221, a power divider T1, a balun 222 and a plurality of antenna units 223. Each of the first antenna port P1 and the second antenna port P2 divides the signal from the feeding portion 221 to the antenna units 223 evenly via the power divider T1. The first antenna array 210 can include a third antenna port P3 and a fourth antenna port P4. In FIG. 3, the power divider T1 can be a 1 to 3 T-junction power divider or combiner, and a number of the branches of the power divider T1 can be adjusted according to the number of the antenna units 223. However, the present disclosure is not limited thereto.

In FIG. 3, the balun 222 is disposed in the first antenna subarray A1 to increase the isolation between the antenna arrays with three frequency bands. In other embodiments of the present disclosure, the balun 222 can be disposed between any of the antenna units 223 and the power divider T1 of the first antenna subarray A1 or the second antenna subarray A2 of the second antenna array 220, so as to increase the isolation between the first antenna array 210 and the second antenna array 220, but the present disclosure is not limited thereto. Thus, the antenna structure 200 of the present disclosure can dispose the balun 222 between at least one of the antenna units 223 and the power divider T1, so as to enhance the current distributing characteristic, maintain great antenna impedance and achieve the decoupling effect.

Figure 4:
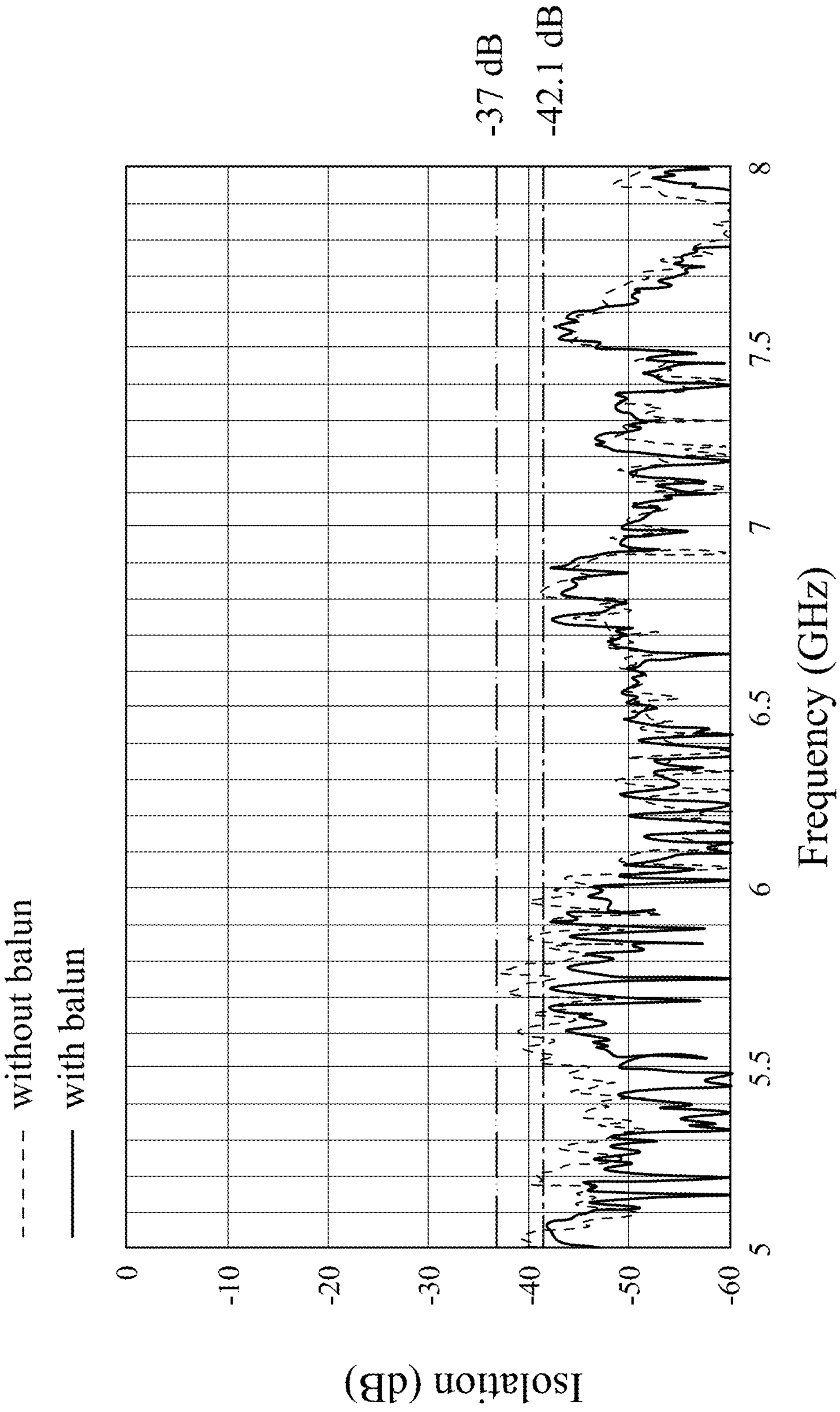
FIG. 4 shows a comparative schematic view of an isolation of the antenna structure according to the first example of the third embodiment of FIG. 3.

Please refer to FIG. 3 and FIG. 4. FIG. 4 shows a comparative schematic view of an isolation of the antenna structure 200 according to the first example of the third embodiment of FIG. 3. In the third embodiment, a polarization of the third antenna port P3 of the first antenna array 210 is the same as a polarization of the second antenna array 220. Specifically, FIG. 4 shows an isolation comparison between the third antenna port P3 of the first antenna array 210 and the first antenna port P1 of the second antenna array 220 without the balun (the conventional art) and with the balun 222. When there is no balun disposed between any of the antenna units 223 and the power divider T1, the isolation between the third antenna port P3 of the first antenna array 210 and the first antenna port P1 of the second antenna array 220 can be up to −37 dB. When the balun 222 is disposed between at least one of the antenna units 223 and the power divider T1, the isolation between the third antenna port P3 of the first antenna array 210 and the first antenna port P1 of the second antenna array 220 can be up to −42.1 dB.

Figure 5:
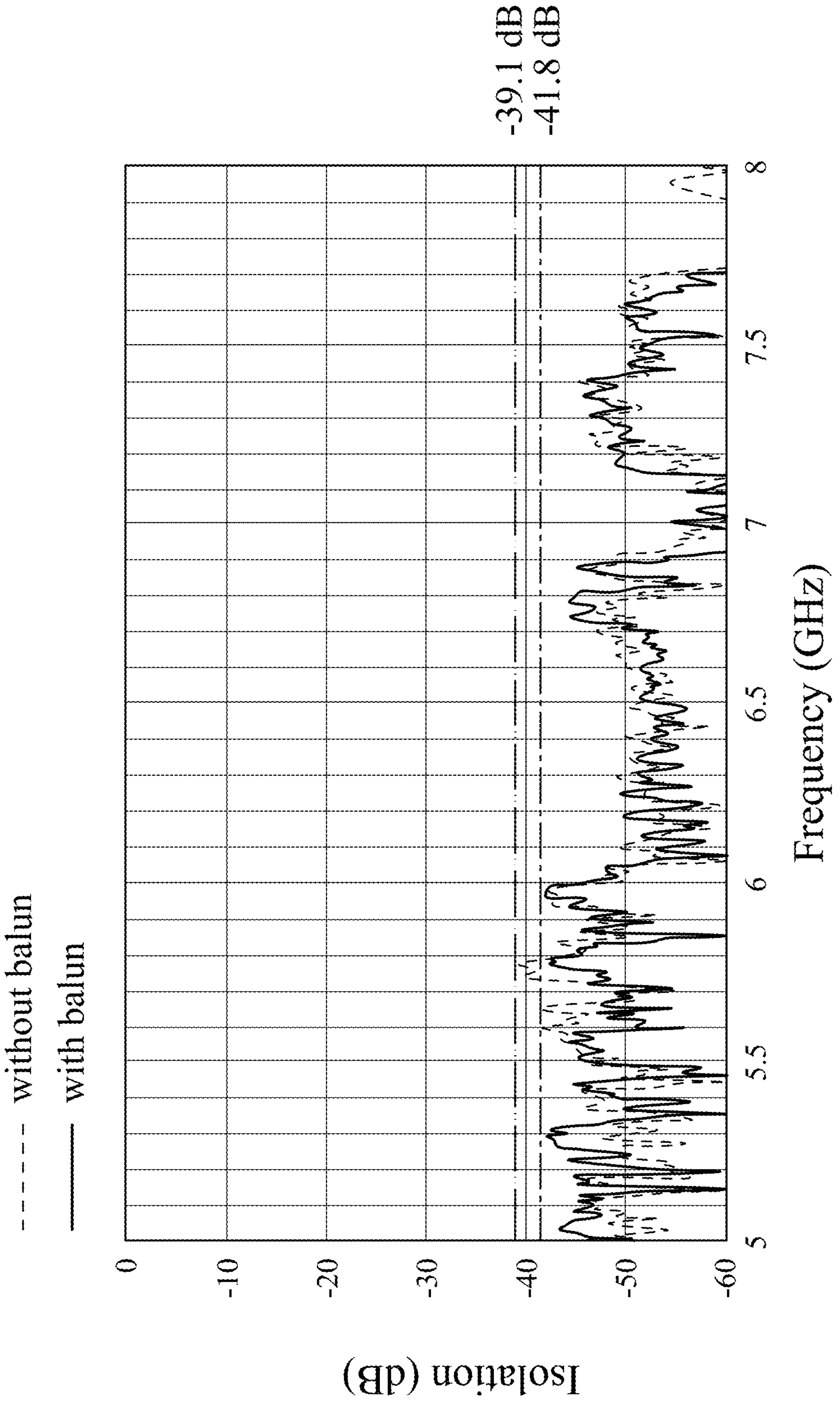
FIG. 5 shows another comparative schematic view of an isolation of the antenna structure according to the first example of the third embodiment of FIG. 3.

Please refer to FIG. 3 and FIG. 5. FIG. 5 shows another comparative schematic view of an isolation of the antenna structure 200 according to the first example of the third embodiment of FIG. 3. In the third embodiment, the fourth antenna port P4 of the first antenna array 210 and the second antenna array 220 are in orthogonal polarization. FIG. 5 shows an isolation comparison between the first antenna port P1 of the second antenna array 220 and the fourth antenna port P4 of the first antenna array 210 without the balun (the conventional art) and with the balun 222. When there is no balun disposed between any of the antenna units 223 and the power divider T1, the isolation between the first antenna port P1 of the second antenna array 220 and the fourth antenna port P4 of the first antenna array 210 can be up to −39.1 dB. When the balun 222 is disposed between at least one of the antenna units 223 and the power divider T1, the isolation between the first antenna port P1 of the second antenna array 220 and the fourth antenna port P4 of the first antenna array 210 can be up to −41.8 dB.

Figure 6:
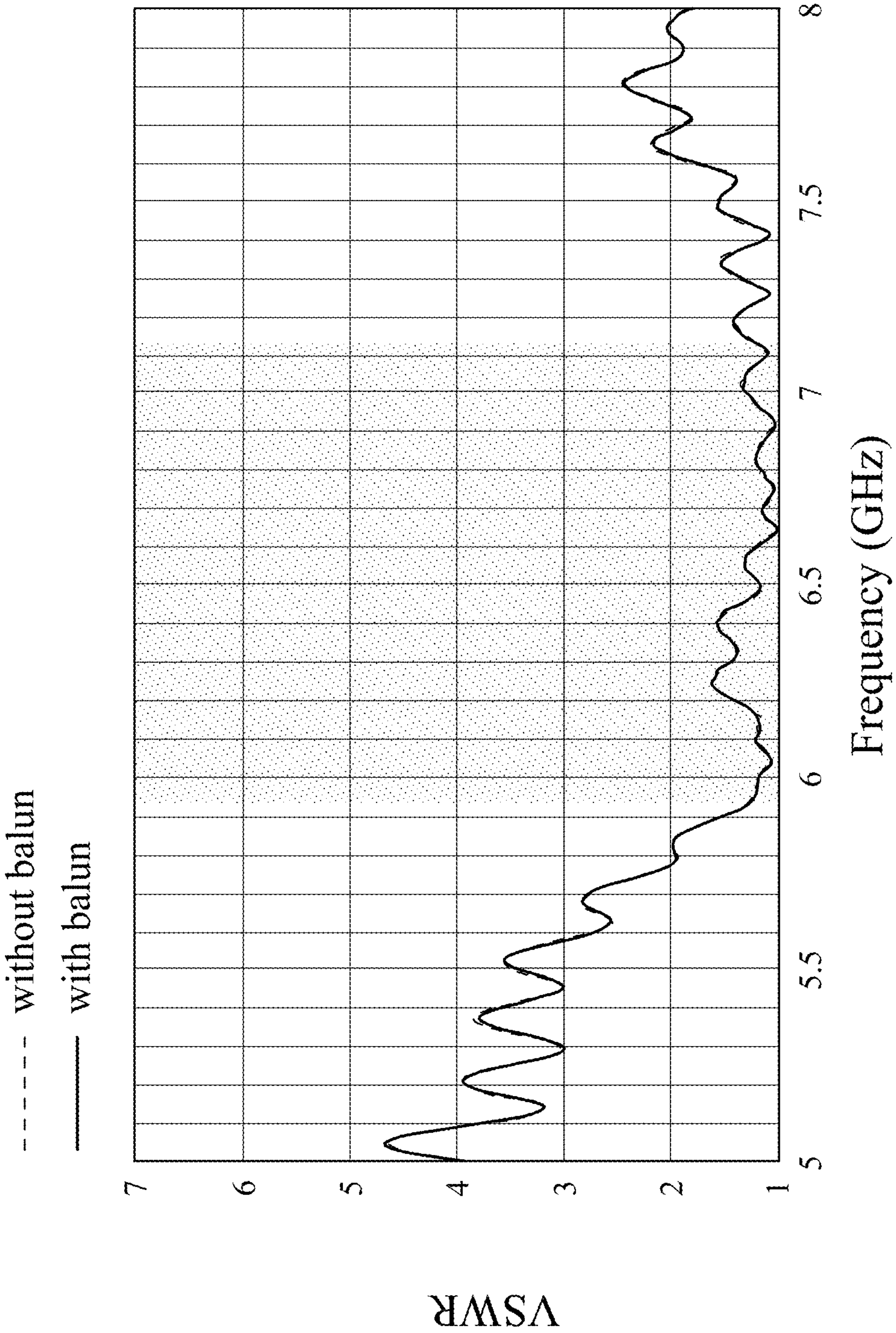
FIG. 6 shows a comparative schematic view of a Voltage Standing Wave Ratio (VSWR) of the second antenna array of the antenna structure according to the first example of the third embodiment of FIG. 3.
Figure 7:
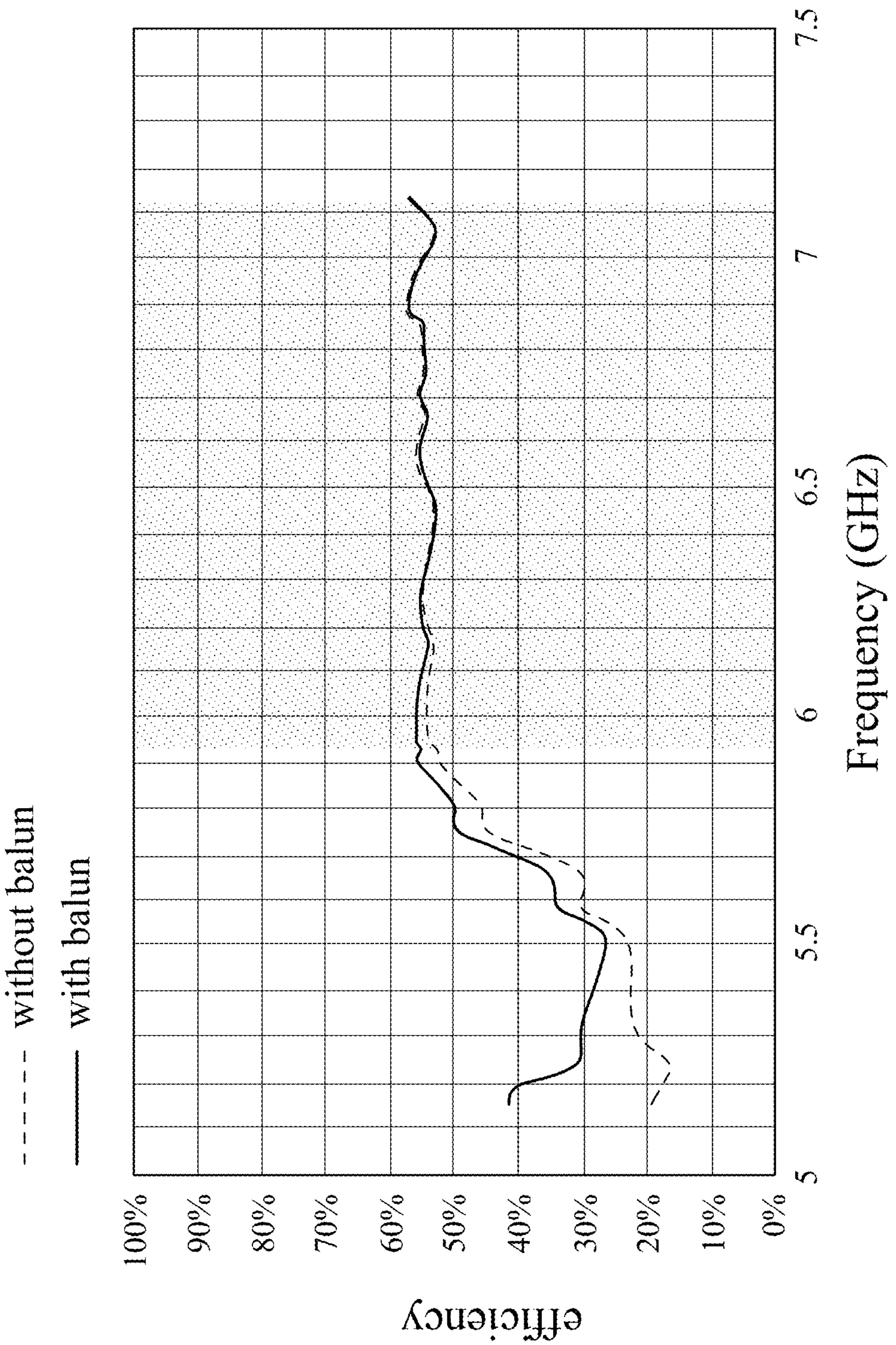
FIG. 7 shows a comparative schematic view of the efficiency of the second antenna array of the antenna structure according to the first example of the third embodiment of FIG. 3.

Please refer to FIG. 3, FIG. 6 and FIG. 7. FIG. 6 shows a comparative schematic view of a VSWR of the second antenna array 220 of the antenna structure 200 according to the first example of the third embodiment of FIG. 3. FIG. 7 shows a comparative schematic view of the efficiency of the second antenna array 220 of the antenna structure 200 according to the first example of the third embodiment of FIG. 3. In FIG. 6 and FIG. 7, the difference of the VSWR and the difference of the efficiency between the second antenna array 220 with the balun 222 and the second antenna array 220 without the balun (the conventional art) while operating in the second frequency band is extremely small. Thus, the antenna structure 200 of the present disclosure can increase the isolation between different frequency bands without affecting the whole efficiency of the second antenna array 220 and the significant parameter of the antenna.

Figure 8:
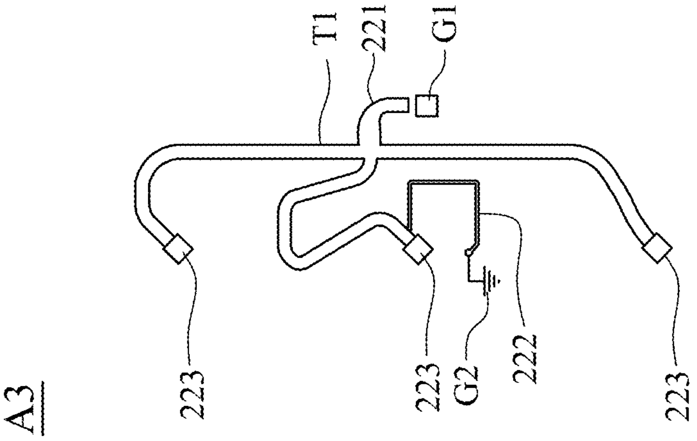
FIG. 8 shows a schematic view of a first antenna subarray of the second antenna array of the antenna structure according to a second example of the third embodiment of FIG. 3.
Figure 9:
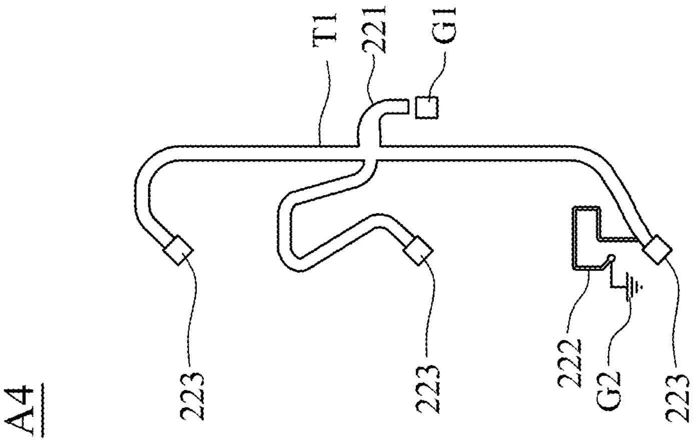
FIG. 9 shows a schematic view of a first antenna subarray of the second antenna array of the antenna structure according to a third example of the third embodiment of FIG. 3.

Please refer to FIG. 3, FIG. 8 and FIG. 9. FIG. 8 shows a schematic view of a first antenna subarray A3 of the second antenna array 220 of the antenna structure 200 according to a second example of the third embodiment of FIG. 3. FIG. 9 shows a schematic view of a first antenna subarray A4 of the second antenna array 220 of the antenna structure 200 according to a third example of the third embodiment of FIG. 3. In FIG. 8 and FIG. 9, the difference between the third example, the second example and the first example of the third embodiment is the disposing position of the balun 222, other structures and features can be the same or similar to the first example, and will not be described again. In FIG. 8, the balun 222 is disposed between the second antenna unit 223 viewed from top to bottom and the power divider T1. In FIG. 9, the balun 222 is disposed between the third antenna unit 223 viewed from top to bottom and the power divider T1. In other embodiments of the present disclosure, the balun 222 can be disposed between any of the antenna units 223 of the second antenna subarray A2 and the power divider T1, but the present disclosure is not limited thereto.

Figure 10:
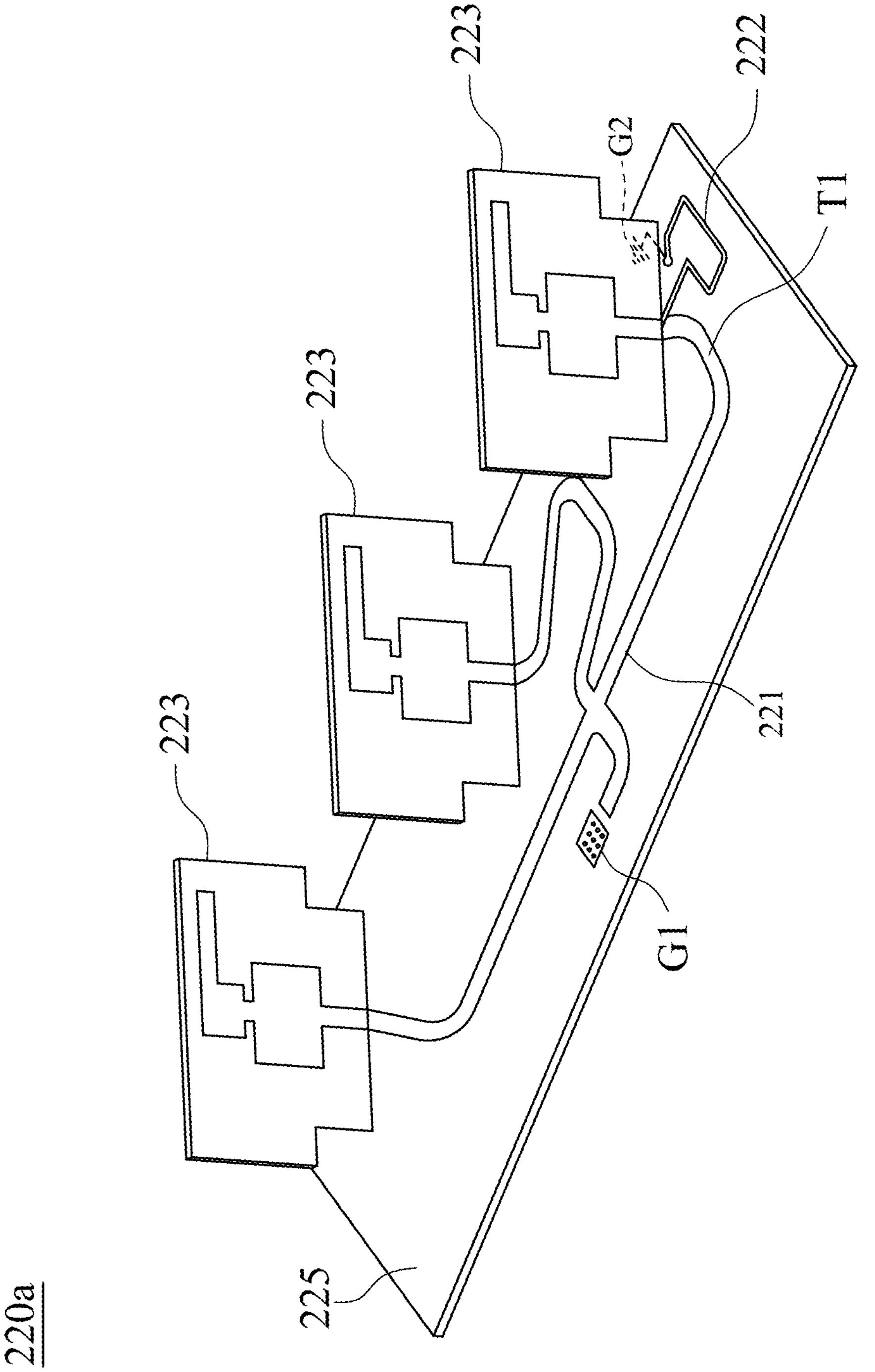
FIG. 10 shows a schematic view of a second antenna array of the antenna structure according to a fourth example of the third embodiment of FIG. 3.
Figure 11:
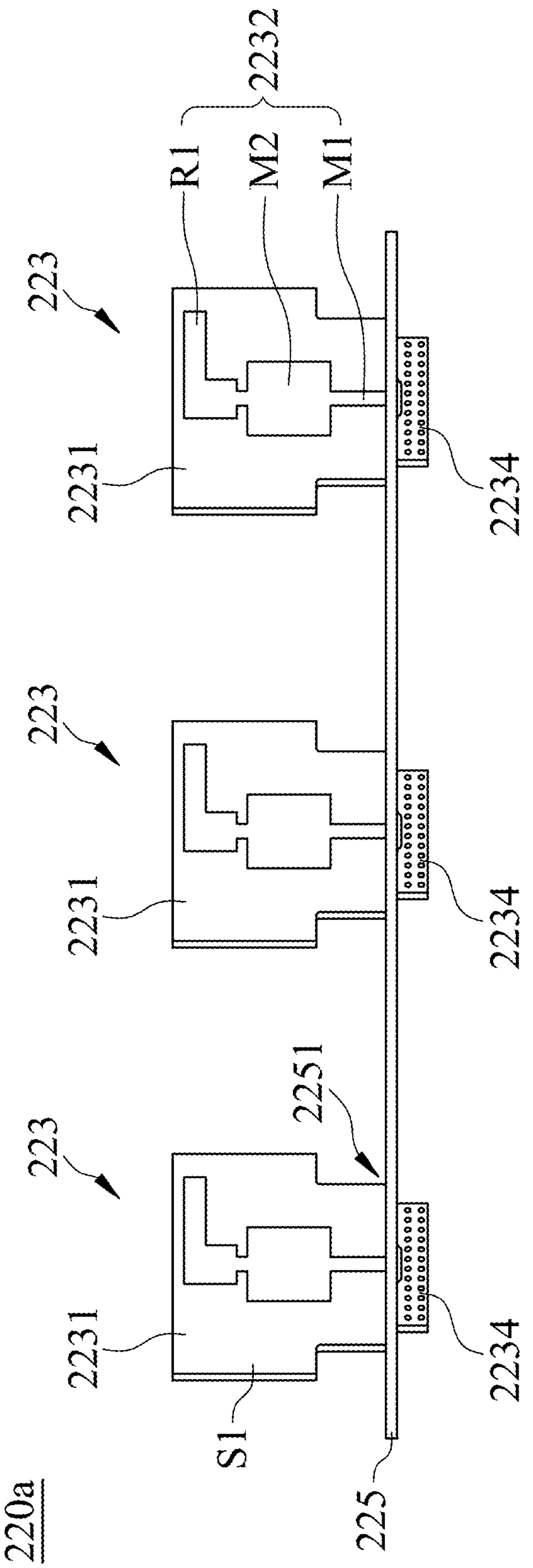
FIG. 11 shows a side view of the second antenna array of the antenna structure according to the fourth example of the third embodiment of FIG. 10.
Figure 12:
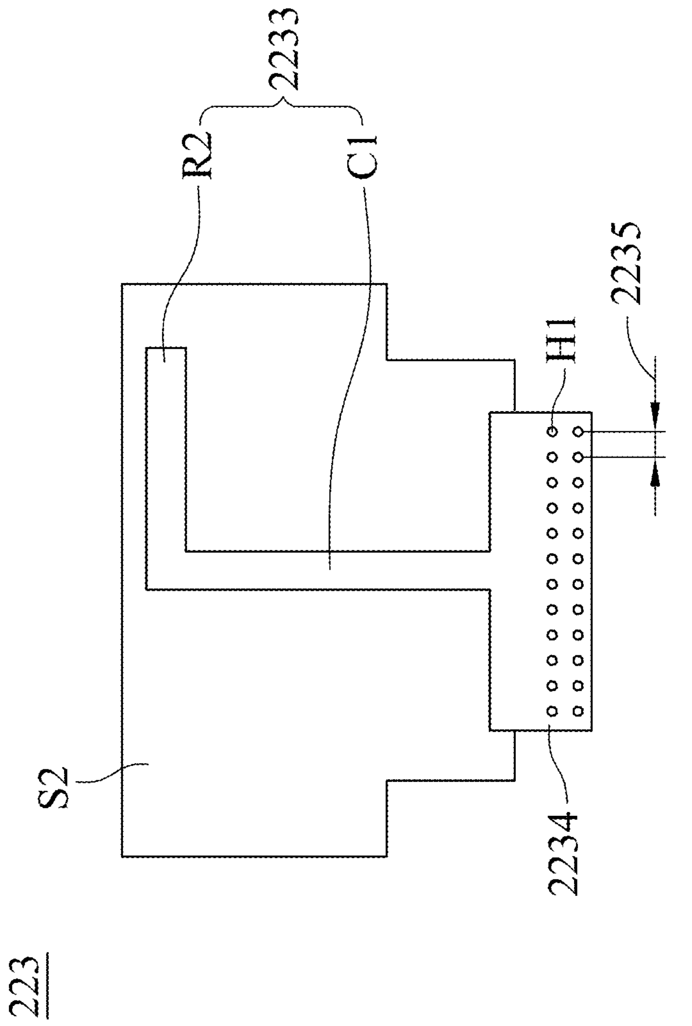
FIG. 12 shows a schematic view of one of the antenna units of the second antenna array of the antenna structure according to the fourth example of the third embodiment of FIG. 10.

Please refer to FIG. 3, FIG. 10 to FIG. 12. FIG. 10 shows a schematic view of a second antenna array 220*a* of the antenna structure 200 according to a fourth example of the third embodiment of FIG. 3. FIG. 11 shows a side view of the second antenna array 220*a* of the antenna structure 200 according to the fourth example of the third embodiment of FIG. 10. FIG. 12 shows a schematic view of one of the antenna units 223 of the second antenna array 220*a* of the antenna structure 200 according to the fourth example of the third embodiment of FIG. 10. In FIG. 10 to FIG. 12, the difference between the fourth example and the first example of the third embodiment is the structure of the second antenna array 220*a*, other structures and features can be the same or similar to the first example, and will not be described again.

In detail, each of the antenna units 223 can include a substrate 2231, a first radiation element 2232 and a second radiation element 2233. The first radiation element 2232 is disposed on a first surface S1 of the substrate 2231, and includes a first matching portion M1, a second matching portion M2 and a first radiation portion R1. The first matching portion M1 is connected to the power divider T1 and the balun 222. The second matching portion M2 is connected to the first matching portion M1. The first radiation portion R1 is connected to the second matching portion M2. The second radiation element 2233 is disposed on a second surface S2 of the substrate 2231, and includes a connecting portion C1 and a second radiation portion R2. The second radiation portion R2 is connected to the connecting portion C1. A terminal of the first radiation portion R1, which is away from the second matching portion M2, is non-overlapping with a terminal of the second radiation portion R2, which is away from the connecting portion C1.

In other words, a first radiation portion R1, which is disposed on the first surface S1 of the substrate 2231, and the second radiation portion R2, which is disposed on the second surface S2 of the substrate 2231, formed a dipole antenna. The first matching portion M1 and the second matching portion M2 are used for matching the impedance.

Furthermore, the second antenna array 220*a* can further include a board element 225. The board element 225 has an opening 2251 and a grounding metal layer (not shown). The feeding portion 221 and the power divider T1 are disposed on a surface of the board element 225, and the grounding metal layer is disposed on the other surface of the board element 225. Each of the antenna units 223 can further include a via array 2234. The via array 2234 is disposed on an end of the substrate 2231, the via array 2234 passes through the opening 2251, so that the antenna unit 223 is fixed on the board element 225. The via array 2234 includes a plurality of vias H1, a gap 2235 of adjacent two of the vias H1 is G, a wavelength of the second antenna array 220*a* operated at the second frequency band is λ, and the following condition is satisfied by a formula (2):

$$G < \frac{\lambda}{10}. \quad (2)$$

Moreover, in order to achieve the automatic production, the antenna units 223 are connected with the board element 225 by a Dual In-line Package (DIP). However, the DIP plug-in manner may lead to electromagnetic wave leakage in the second frequency band, affecting the impedance matching. Thus, the antenna structure 200 of the present disclosure can provide great efficiency performance and increase the isolation of the antenna by disposing the via array 2234, which passes through the first surface S1 and the second surface S2 of the substrate 2231 as an equivalent metal wall.

According to the aforementioned embodiments and examples, the advantages of the present disclosure are described as follows.

1. The antenna structure of the present disclosure can increase the isolation between the first frequency band antenna and the second frequency band antenna via the balun.
2. The antenna structure of the present disclosure can prevent the radio frequency signal from flow into the ground by disposing the choke element at a front terminal of the second frequency band antenna.

3. The antenna structure of the present disclosure can dispose the balun between at least one of the antenna units and the power divider, so as to enhance the current distributing characteristic, maintain great antenna impedance and achieve the decoupling effect.
4. The antenna structure of the present disclosure can increase the isolation between different frequency bands without affecting the whole efficiency of the second antenna array and also reserving significant parameter of the antenna.
5. The antenna structure of the present disclosure can provide great efficiency performance and increase the isolation of the antenna by disposing the via array, which passes through the first surface and the second surface of the substrate as an equivalent metal wall.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna structure, comprising:
a first frequency band antenna operated at a first frequency band; and
a second frequency band antenna operated at a second frequency band, and comprising:
a feeding portion;
a balun connected to the feeding portion; and
at least one antenna unit connected to the balun;
wherein the first frequency band is different from the second frequency band;
wherein a length of the balun is L, a wavelength of the second frequency band antenna operated at the second frequency band is λ, and the following condition is satisfied:

$$L = \frac{(2N-1)\lambda}{4};$$

wherein N is a positive integer.

2. The antenna structure of claim 1, further comprising:
a choke element connected between the feeding portion and the balun.

3. The antenna structure of claim 1, wherein a terminal of the balun is connected to the feeding portion, and another terminal of the balun is connected to a grounding portion.

4. The antenna structure of claim 1, wherein the at least one antenna unit is a dipole antenna.

5. The antenna structure of claim 1, wherein the at least one antenna unit comprises:
a substrate;
a first radiation element disposed on a first surface of the substrate, and comprising:
a first matching portion connected to the feeding portion and the balun;
a second matching portion connected to the first matching portion; and a first radiation portion connected to the second matching portion; and
a second radiation element disposed on a second surface of the substrate, and comprising:
a connecting portion; and
a second radiation portion connected to the connecting portion;
wherein a terminal of the first radiation portion, which is away from the second matching portion, is non-overlapping with a terminal of the second radiation portion, which is away from the connecting portion.

6. The antenna structure of claim 1, wherein,
the second frequency band antenna further comprising:
a board element having an opening, wherein the feeding portion is disposed on the board element;
the at least one antenna unit comprising:
a substrate; and
a via array disposed on an end of the substrate, wherein the via array passes through the opening, so that the at least one antenna unit is fixed on the board element.

7. The antenna structure of claim 6, wherein the at least one antenna unit is connected with the board element by a Dual In-line Package.

8. The antenna structure of claim 6, wherein the via array comprises a plurality of vias, a gap of adjacent two of the vias is G, and the following condition is satisfied:

$$G < \frac{\lambda}{10}.$$

9. An antenna structure comprising:
a first antenna array operated at a first frequency band; and
a second antenna array operated at a second frequency band, and comprising:
a feeding portion;
a power divider connected to the feeding portion;
a plurality of antenna units connected to the power divider; and
a balun connected between the power divider and one of the antenna units;
wherein the first frequency band is different from the second frequency band;
wherein a length of the balun is L, a wavelength of the second antenna array operated at the second frequency band is A, and the following condition is satisfied:

$$L = \frac{(2N-1)\lambda}{4};$$

wherein N is a positive integer.

10. The antenna structure of claim 9, further comprising:
a choke element connected between the power divider and the balun.

11. The antenna structure of claim 9, wherein a terminal of the balun is connected to the feeding portion, and another terminal of the balun is connected to a grounding portion.

12. The antenna structure of claim 9, wherein each of the antenna units is a dipole antenna.

13. The antenna structure of claim 9, wherein each of the antenna units comprises:
a substrate;
a first radiation element disposed on a first surface of the substrate, and comprising:

a first matching portion connected to the power divider and the balun;
a second matching portion connected to the first matching portion; and
a first radiation portion connected to the second matching portion; and
a second radiation element disposed on a second surface of the substrate, and comprising:
a connecting portion; and
a second radiation portion connected to the connecting portion;
wherein a terminal of the first radiation portion, which is away from the second matching portion, is non-overlapping with a terminal of the second radiation portion, which is away from the connecting portion.

14. The antenna structure of claim 9, wherein,
the second antenna array further comprising:
a board element having an opening, wherein the feeding portion and the power divider are disposed on the board element;
each of the antenna units comprising:
a substrate; and
a via array disposed on an end of the substrate, wherein the via array passes through the opening, so that each of the antenna units is fixed on the board element.

15. The antenna structure of claim 14, wherein the via array comprises a plurality of vias, a gap of adjacent two of the vias is G, and the following condition is satisfied:

$$G < \frac{\lambda}{10}.$$

16. The antenna structure of claim 9, wherein the power divider is a 1 to 3 T-junction power divider or combiner.

17. The antenna structure of claim 14, wherein the antenna units are connected with the board element by a Dual In-line Package.

* * * * *